United States Patent
Hirsch

(10) Patent No.: US 11,717,382 B2
(45) Date of Patent: Aug. 8, 2023

(54) ORTHODONTIC OR DENTAL APPLIANCE

(71) Applicant: HIT Health Intelligent Technologies AG, Pfaeffikon SZ (CH)

(72) Inventor: Markus Hirsch, Klagenfurt (AT)

(73) Assignee: HIT Health Intelligent Technologies AG, Pfaeffikon SZ (CH)

( * ) Notice: Subject to any disclaimer, the term of this patent is extended or adjusted under 35 U.S.C. 154(b) by 442 days.

(21) Appl. No.: 16/157,377

(22) Filed: Oct. 11, 2018

(65) Prior Publication Data

US 2020/0113651 A1    Apr. 16, 2020

(51) Int. Cl.
| | |
|---|---|
| *A61C 7/00* | (2006.01) |
| *A61C 7/08* | (2006.01) |
| *B32B 27/08* | (2006.01) |
| *B32B 27/36* | (2006.01) |
| *B29C 41/48* | (2006.01) |

(52) U.S. Cl.
CPC ............... *A61C 7/008* (2013.01); *A61C 7/08* (2013.01); *B32B 27/08* (2013.01); *B32B 27/36* (2013.01); *B29C 41/48* (2013.01); *B29C 2791/002* (2013.01); *B29C 2793/009* (2013.01); *B32B 2535/00* (2013.01)

(58) Field of Classification Search
CPC ........... A61C 7/008; A61C 7/002; A61C 8/00; A61C 8/0093; A61C 8/0095; A61C 8/0096; A61C 2204/005; B32B 27/08; B32B 27/36; B32B 2535/00; B32B 38/10; B32B 1/06; B32B 1/00; B32B 43/06; B32B 7/06
USPC ............. 433/6, 167, 171, 199.1, 201.1, 213; D24/156, 180; 156/719, 247–249; 264/16, 17, 18, 19, 20, 229, 220, 222, 264/226; 428/482, 483
See application file for complete search history.

(56) References Cited

U.S. PATENT DOCUMENTS

2012/0295212 A1* 11/2012 Sakimura ............. A61C 19/066
                                                                433/6
2019/0337199 A1* 11/2019 Jo ........................... B29C 43/50

FOREIGN PATENT DOCUMENTS

| DE | 10 2008 061 325 A1 | 4/2010 | |
| WO | WO-2010043419 A1 * | 4/2010 | ............... A61C 7/08 |
| WO | 2017/006176 A1 | 1/2017 | |

OTHER PUBLICATIONS

Isofolan Product data sheet (https://www.greatlakesdentaltech.com/media/sds/030-002%20.10%20x%20125%20Round%20Isofolan.pdf), accessed Feb. 12, 2021, (Year: 2010).*
English Translation of the Extended European Search Report in European Application No. 19202411.5-1126 dated Feb. 12, 2020.

* cited by examiner

*Primary Examiner* — S. Behrooz Ghorishi
(74) *Attorney, Agent, or Firm* — Collard & Roe, P.C.

(57) ABSTRACT

A method for producing an orthodontic or dental appliance includes laminating a layer of polyethylene terephthalate (PET) with a layer of polyethylene to form a multilayer film, forming the multilayer film into the shape of an orthodontic appliance, trimming the formed film to a desired shape, and removing the layer of polyethylene. In one embodiment, the appliance is a multi-layer structure formed from two adjacent layers of PET with a plurality of functional elements such as sensors or actuators between the two layers.

6 Claims, 2 Drawing Sheets

ORTHODONTIC OR DENTAL APPLIANCE

BACKGROUND OF THE INVENTION

1. Field of the Invention

The present invention relates to an orthodontic or dental appliance for straightening teeth. In particular, the invention relates to an appliance that is formed from PET (polyethylene terephthalate) that is laminated with a layer of PE (polyethylene).

2. The Prior Art

Orthodontic appliances are commonly used for straightening teeth. The appliances are thermo-formed from molds made of a sequence of desired tooth formation, and then are placed on the patient's teeth to incrementally straighten the teeth over time.

The appliances are generally made of a translucent plastic, such as polyurethane or PET. It is often very uncomfortable for the patient upon receiving a new appliance, as the teeth have not yet moved into position, which can cause excessive pressure on the teeth.

It would be desirable to create an appliance that has a very smooth surface to increase patient comfort, as well as have accessories that can speed the movement of teeth so that the duration of patient discomfort is minimized.

SUMMARY OF THE INVENTION

These and other objects are accomplished by an orthodontic or dental appliance that is formed by taking a film formed from a layer of PET that has been laminated with a layer of polyethylene, thermoforming the film into the shape of the appliance, cutting the appliance to shape, and then removing the layer of polyethylene. The polyethylene can be adhered to the PET by adhesive or static charge. The adhesive is a low-tack adhesive which resists the forming temperatures of 150° C.

In one embodiment, the appliance is formed from two layers of PET, with a functional layer in between, and the layer of PE applied to one side. The functional layer can be embedded with sensors or actuators which generate vibrations. The functional layer can be formed of another thermoplastic material. Alternatively, the sensors or actuators can be embedded in one of the PET layers, and the second PET layer applied directly over them, to eliminate the need for the functional layer.

The actuators can be vibration generators that can then be connected to an external device by the end customer. The gentle vibration, used for a few minutes per day, will help the teeth to adjust faster and reduces the treatment time significantly.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
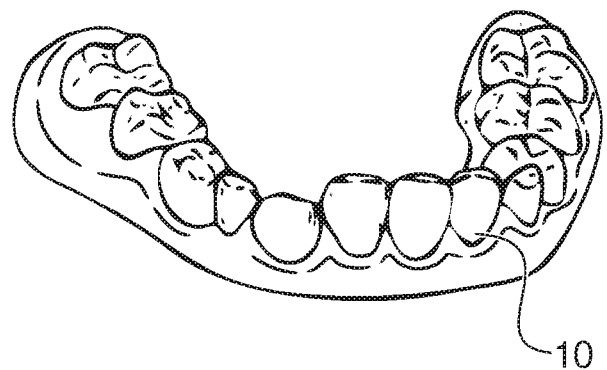
FIG. 1 shows a standard orthodontic appliance which has the same general shape as the appliance according to the invention.
Figure 2:
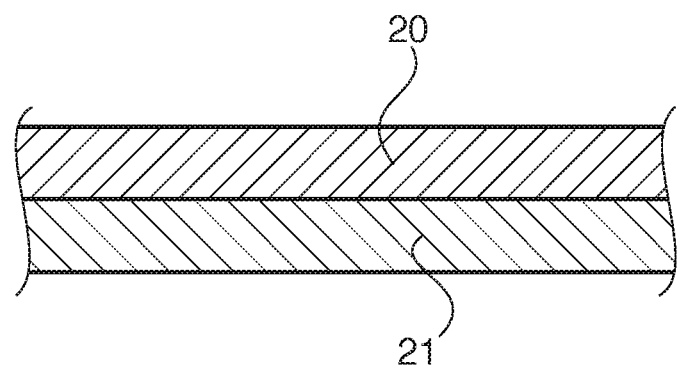
FIG. 2 shows a cross-sectional view of the structural layers of one embodiment of the appliance.

Referring now in detail to the drawings and, in particular, FIG. 1 shows an orthodontic appliance 10 in the shape and structure of the present invention. Appliance 10 is formed by making a mold of a patient's teeth, forming a sheet of plastic over the mold via thermo-forming, vacuum-forming or any other suitable method, and then trimming the formed plastic to size. As shown in FIG. 2, in the present invention the plastic sheet is made of a layer 20 of polyethylene terephthalate (PET) that has a layer 21 of polyethylene adhered to it. Layer 21 is then removed prior to use. The polyethylene layer 21 can be adhered to the PET layer 20 by adhesive or static charge. The adhesive is a low-tack adhesive which resists the forming temperatures of 150° C.

Figure 3:
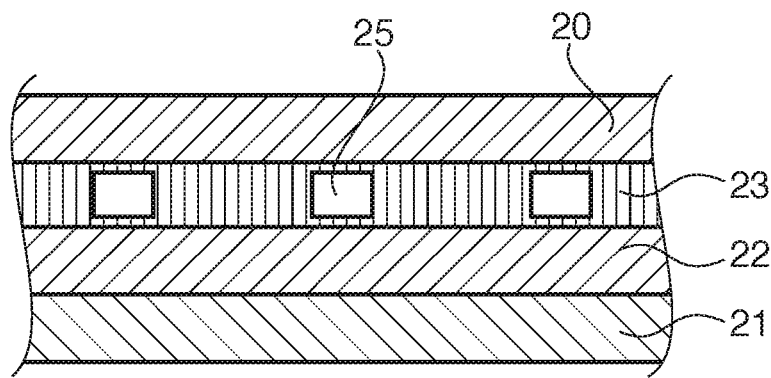
FIG. 3 shows a cross-sectional view of the structural layers of a second embodiment of the appliance.

In another embodiment shown in FIG. 3, the plastic of aligner 10 is formed from two layers of PET 20, 22, with a thermoplastic layer 23 in between. The polyethylene layer 21 is adhered to one of the PET layers 20, 22 in the same manner described above. Embedded in the thermoplastic layer 23 are a plurality of functional elements 25. Functional elements 25 can be sensors, vibration generators or any other type of electronic device that would be useful in the orthodontic field. If functional elements 25 are vibration generators, their use can be beneficial in reducing the amount of time needed for a patient to adjust to a new aligner. The vibrations generated by functional elements 25 speed up tooth movement to reduce patient discomfort. The vibration generators can be activated by connecting them to an external power source (not shown).

Figure 4:
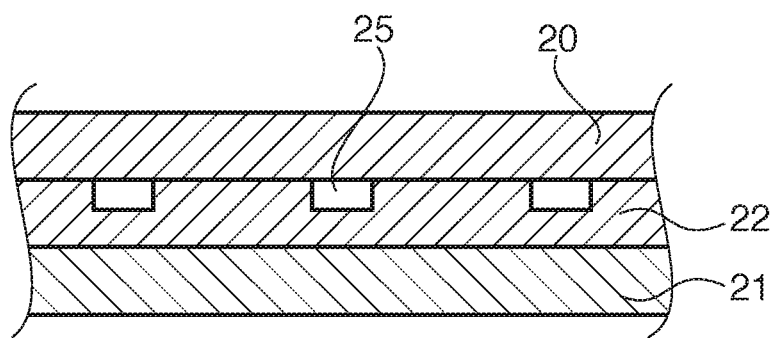
FIG. 4 shows a cross-sectional view of the structural layers of a third embodiment of the appliance.

In another embodiment shown in FIG. 4, functional elements 25 are embedded directly in PET layer 22, which is adhered to PET layer 20.

Accordingly, while only a few embodiments of the present invention have been shown and described, it is obvious that many changes and modifications may be made thereunto without departing from the spirit and scope of the invention.

What is claimed is:

1. A method for producing an orthodontic or dental appliance, comprising:
    laminating a layer of polyethylene terephthalate (PET) in the form of a sheet with a layer of polyethylene in the form of a sheet, prior to forming the orthodontic or dental appliance, to form a multilayer film,
    subsequently forming the multilayer film into the shape of the orthodontic or dental appliance;
    trimming each layer of the formed multilayer film to a desired shape; and
    subsequently removing the layer of polyethylene from the trimmed formed multilayer film after said step of trimming.

2. The method according to claim 1, further comprising the step of providing a second layer of PET adjacent the layer of PET and providing a plurality of functional elements between the two layers of PET.

3. The method according to claim 2, wherein the functional elements are selected from the group consisting of sensors and actuators.

4. The method according to claim 2, wherein the functional elements are embedded in a functional layer between the two layers of PET.

5. The method according to claim 4, wherein the functional layer is formed from thermoplastic material.

6. The method according to claim 2, wherein the functional elements are embedded in one of the layers of PET.

* * * * *